(12) United States Patent
Griesmeyer

(10) Patent No.: US 10,387,915 B2
(45) Date of Patent: Aug. 20, 2019

(54) DIGITAL MAGAZINE RECOMMENDATIONS BY TOPIC

(71) Applicant: Flipboard, Inc., Palo Alto, CA (US)

(72) Inventor: Robert Griesmeyer, San Francisco, CA (US)

(73) Assignee: Flipboard, Inc., Palo Alto, CA (US)

( * ) Notice: Subject to any disclaimer, the term of this patent is extended or adjusted under 35 U.S.C. 154(b) by 783 days.

(21) Appl. No.: 14/927,201

(22) Filed: Oct. 29, 2015

(65) Prior Publication Data

US 2017/0124590 A1    May 4, 2017

(51) Int. Cl.
| | |
|---|---|
| *G06F 17/21* | (2006.01) |
| *G06F 16/35* | (2019.01) |
| *G06Q 30/02* | (2012.01) |
| *H04L 29/06* | (2006.01) |
| *H04L 29/08* | (2006.01) |
| *G06F 16/335* | (2019.01) |

(52) U.S. Cl.
CPC ....... *G06Q 30/0255* (2013.01); *G06F 16/335* (2019.01); *G06F 16/35* (2019.01); *G06F 17/212* (2013.01); *G06Q 30/0241* (2013.01); *G06Q 30/0251* (2013.01); *H04L 67/02* (2013.01); *H04L 67/10* (2013.01); *H04L 67/125* (2013.01); *H04L 67/2833* (2013.01); *H04L 67/306* (2013.01); *H04L 67/42* (2013.01)

(58) Field of Classification Search
CPC .... G06Q 30/0207–0277; G06F 17/212; G06F 17/30

USPC ................. 705/14.1, 14.49, 14.53; 715/243; 707/749

See application file for complete search history.

(56) References Cited

U.S. PATENT DOCUMENTS

| | | | |
|---|---|---|---|
| 8,370,348 B1 * | 2/2013 | Reilly | G06Q 30/02 707/731 |
| 9,002,858 B1 * | 4/2015 | Dassa | G06F 16/335 707/750 |
| 2005/0246361 A1 * | 11/2005 | Tuv | G06K 9/6215 |
| 2013/0097186 A1 * | 4/2013 | van Hoff | H04L 67/306 707/749 |
| 2014/0075275 A1 * | 3/2014 | Aleksandrovsky | G06F 17/2229 715/202 |
| 2014/0075296 A1 * | 3/2014 | Schaad | G06F 17/2229 715/243 |
| 2015/0186491 A1 * | 7/2015 | Zukerman | G06F 17/30702 707/740 |

* cited by examiner

*Primary Examiner* — Kiersten V Summers
(74) *Attorney, Agent, or Firm* — Fenwick & West LLP

(57) ABSTRACT

A digital magazine server scores digital magazines based on how related the digital magazines are to each of a set of topics in a topic vector space, which allows ranking for each topic the magazines that are most closely related to the topic. The digital magazine server generates a magazine vector for the magazine in the topic vector space by aggregating extracted topics for the magazine and compares the magazine vector to each of the topics to determine a magazine-topic relevance score that indicates the relevance of the digital magazine to each topic in the topic vector space. The digital magazine server then ranks each of the digital magazines by their magazine-topic relevance scores for a particular topic, e.g., a trending topic from a user request, and selects a top number of magazines for the trending topic for the user.

12 Claims, 5 Drawing Sheets

DIGITAL MAGAZINE RECOMMENDATIONS BY TOPIC

BACKGROUND

The disclosure generally relates to providing digital content to a user of a digital magazine server, and more specifically to recommending digital magazines scored based on topics of interest to that user.

Digital distribution channels disseminate a wide variety of digital content including text, images, audio, links, videos, and interactive media (e.g., games, collaborative content) to users. The increasingly popular computing devices, such as smart phones, tablet computers, and increased network bandwidth (for wired and wireless networks) have provided more communications platforms for users to search and consume digital content. However, users can be overwhelmed by the broad and unfiltered digital content available to users. Existing techniques for recommending digital content to users are based on previous interactions by users with an online system, such as a social networking system. However, these conventional techniques often fail to present users with meaningful content on topics likely to be of interest to users, especially if the content has not been accessed by the user via the online system. Additionally, while some existing online systems manually curate digital magazine cover pages with content of interest to a user, these manually curated cover pages often fail to accommodate the dynamically changing interests of the user and the diverging topics in the digital content items.

SUMMARY

A digital magazine server scores digital magazines based on how related the digital magazines are to each of a set of topics, which allows ranking for each topic the magazines that are most closely related to the topic. In one embodiment, the digital magazine server extracts topics from content items (e.g., articles) contained in each digital magazine, which may be represented in a topic vector space. The digital magazine server then aggregates the extracted topics for each magazine to generate a magazine vector for the magazine in the topic vector space. The vectors for the digital magazines are then compared to each of the topics to determine a magazine-topic relevance score that indicates the relevance of each digital magazine to each topic in the topic vector space. The digital magazine server then ranks each of the digital magazines by their magazine-topic relevance scores for a particular topic, and the top number of magazines can then be selected to determine the top magazines for the topic.

The group of "top magazines" for each topic may be used for recommending magazines of possible interest to a user, e.g., who may have indicated an interest in a particular topic. In one example, in response to a user request or interaction with a digital magazine application executing on a client device of the user, the digital magazine server determines a user trending topic (or any other topic of interest for the user) from the user request/interaction and selects a threshold number of digital magazines on the determined user trending topic. Each selected digital magazine is related to the trending topic, and its relevance is determined based on a relevance score associated with each selected digital magazine. Each selected digital magazine has one or more articles on the trending topic.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Example Digital Magazine System Environment

One embodiment of a disclosed configuration is a system (or a computer implemented method or a non-transitory computer readable medium) for determining a magazine-topic relevance score for a digital magazine that indicates the relevance of the digital magazine to a topic in a topic vector space. Multiple digital magazines are ranked by their magazine-topic relevance scores for a particular topic, and a group of magazines are selected to determine the top magazines for the topic. A group of the topic magazines on a topic of interest to a user is selected and presented to the user. A "digital magazine" herein refers to an aggregation of digital content items that can be presented to users in a presentable format similar to the format used by print magazines. A "content item" or "article" herein refers to any machine-readable and machine-storable work product, such as textual articles, pictures/images, videos, user-generated content (e.g., content posted on a social networking system), advertisements, and any other types of digital content capable of display within the context of a digital magazine. In one embodiment, a digital magazine assembles a list of universal resource locators (URLs), where each article of the digital magazine is based on the content of a resource on the Internet to which a URL of the list of the URLs references to.

Figure 1:
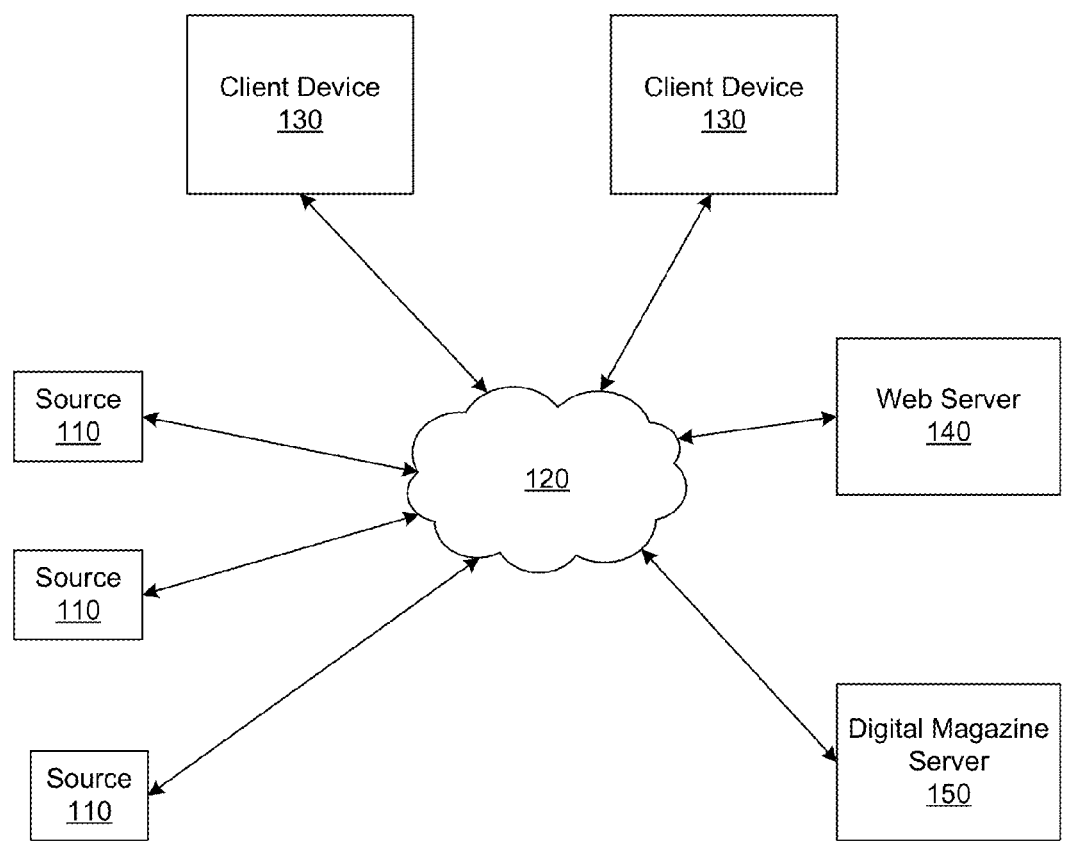
FIG. 1 is a block diagram of a system environment in which a digital magazine server operates according to one embodiment.

FIG. 1 is a block diagram of a system environment 100 for a digital magazine server 150 according to one embodiment. The system environment 100 shown by FIG. 1 includes one or more sources 110, a network 120, one or more client devices 130, a web server 140 and a digital magazine server 150. Only three sources 110, two client devices 130, one web server 140 and one digital magazine server 150 are shown in FIG. 1 in order to simplify the description. Embodiments of the system environment 100 can have many sources 110, client devices 130, web servers 140 and digital magazine servers 150 connected to the network 120. Likewise, the functions performed by the various entities of FIG. 1 may differ in different embodiments. The embodiments described herein can be adapted to online systems that are not digital magazine severs 150.

A source 110 is a computing system capable of providing various types of digital content to a client device 130 and a digital magazine server 150. Examples of content provided by a source 110 include text, images, video, or audio on web pages, web feeds, social networking information, messages, or other suitable digital data. Additional examples of content include user-generated content such as blogs, tweets, shared images, videos or audios, social networking posts, and social networking status updates. Content provided by a source 110 may be received from a publisher and distributed by the source 110; alternatively, a source 110 may be a publisher of content it generates. For convenience, content from a source 110, regardless of its composition, is referred to herein as an "article," a "content item," or as "content." A content item may include various types of content elements such as text, images, video, interactive media, links, and a combination thereof.

The sources 110 communicate with the client device 130 and the digital magazine server 150 via the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.1, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is a computing device capable of receiving user input as well as transmitting and/or receiving digital data via the network 120. Various embodiments of the client device 130 include a conventional computer system, such as a desktop or a laptop computer, and a device having computer functionality, such as a personal digital assistant (PDA), a mobile telephone, a smartphone or another suitable device. In one embodiment, the client device 130 executes an application allowing a user of the client device 130 to interact with the digital magazine server 150. For example, an application executing on the client device 130 communicates instructions or requests for content items to the digital magazine server 150. The client device 130 also executes a browser that receives pages from the digital magazine server 150 and presents the pages to a user of the client device 130. In another embodiment, the client device 130 interacts with the digital magazine server 150 through an application programming interface (API) running on a native operating system of the client device 130, such as IOS® or ANDROID™.

Different client devices 130 may have different characteristics such as different processing capabilities, different connection speeds with the digital magazine server 150 over the network 120, and different device types (e.g., make, manufacture, version). For example, in one embodiment, a client device 130 includes a display device (not shown) and an input device (not shown). A display device included in the client device 130 presents content items to a user of the client device 130. An input device included in the client device 130 receives input from a user of the client device 130. The user input is processed by a digital magazine application executing on the client device 130 to allow the user to interact with content items presented by the digital magazine server 150.

The web server 140 is a computer system that process requests based on network protocols, e.g., HTTP. In one embodiment, the web server 140 links the digital magazine server 150 via the network 120 to the one or more client devices 130, as well as to the one or more sources 110. The web server 140 serves web pages as well as other digital content to the digital magazine server 150 and communicates instructions to a client device 130 for generating pages of content items in a suitable presentation style/format for presentation to a user of the client device 130. In the embodiment shown in FIG. 1, the web server 140 is a network entity separate from the digital magazine server 150. In other embodiments, the web server 140 is a component of the digital magazine server 150.

The digital magazine server 150 ranks digital magazines for each topic in a topic vector space that is likely of interest to a user, selects one or more digital magazines based on the ranking and presents the selection to the user. For example, in response to a user request or interaction with a digital magazine application executing on a client device 130 of the user, the digital magazine server 150 determines a user trending topic or any topic that is of interest to the user from the user request/interaction, and selects a threshold number of digital magazines for the determined user trending topic. Each selected digital magazine is related to the trending topic and its relevance is determined based on a magazine-topic relevance score associated with each selected digital magazine. Each selected digital magazine has one or more articles on the trending topic. One embodiment of the digital magazine server 150 is further described with reference to FIG. 2 below.

Example Digital Magazine Server

Figure 2:
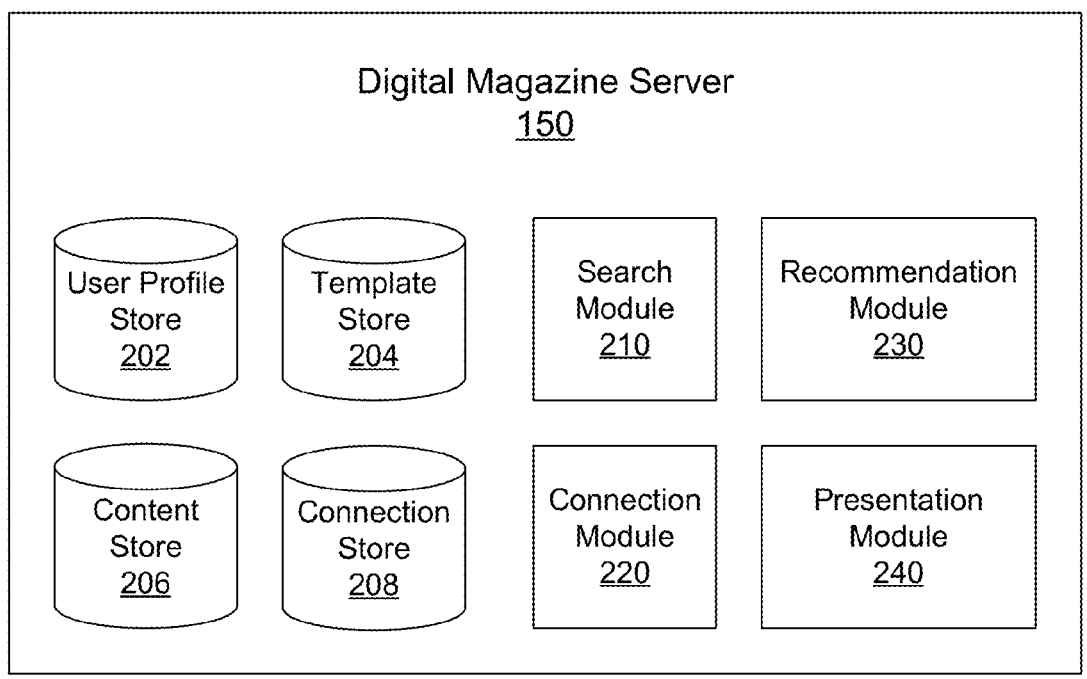
FIG. 2 is a block diagram of an example digital magazine server according to one embodiment.

FIG. 2 is a block diagram of a digital magazine server 150 according to one embodiment. In the embodiment shown in FIG. 2, the digital magazine server 150 has a user profile store 202, a template store 204, a content store 206, a connection store 208, a search module 210, a connection module 220, a recommendation module 230 and a presentation module 240. In other embodiments, the digital magazine server 150 may include additional, fewer, or different entities for various applications.

The user profile store 202 stores user profiles of users of the digital magazine server 150. Examples of information stored in a user profile include biographic, demographic (e.g., age, gender, occupation, education, socioeconomic status), and other types of information, such as gender, hobbies or preferences, location (e.g., residence, birthplace, check-in locations), or other suitable information. The user profile store 202 may also include information for accessing one or more online networking systems or other types of sources (e.g., a user name, a password, an access code) that a user has authorized the digital magazine server 150 to access.

The template store 204 stores page templates each describing a spatial arrangement ("layout") of content items relative to each other on a page for presentation by a client device 130. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110.

The content store 206 stores objects that represent various types of digital content. In one embodiment, the objects are URLs, each of which references to a resource on the Internet. For example, the content store 206 stores content items received from one or more sources 110 (e.g., the resources referenced to by the URLs) within a threshold time of a current time, e.g., 6 months. Examples of content items stored by the content store 206 include page posts, status updates, photographs, videos, links, news articles, audios, check-in events at locations, or any other types of content.

The connection stores 208 stores interactions between a user and content items presented by the digital magazine server 150. The data describing interactions by a user with a content item includes a content item identifier, a description of an interaction with the content item (e.g., viewing, clicking, sharing, etc.) corresponding to the content item identifier, and a time when the interaction occurred. In one embodiment, the connection stores 208 stores data describing user interactions with content items over a threshold period of time, e.g., 6 months. The long-term interaction data of a user are indicators of ground truth of the user's interest in content times. Content items a user previously interacted with may be retrieved by the digital magazine server 150 using the content item identifiers in the user's user profile, allowing the digital magazine server 150 to recommend content items to the user based on content items with which the user previously interacted.

The search module 210 receives a search query from a user and retrieves content items from one or more sources 110 based on the search query. For example, content items having at least a portion of an attribute matching at least a portion search query are retrieved from one or more sources 110. To more efficiently identify content items based on search queries, the search module 210 may index content items, groups (or sections) of content items, and user profile information. In one embodiment, the index includes information about various content items, such as topic, author, source, creation data/time, user interaction information, document title, or other information capable of uniquely identifying the content item. Search queries are compared to information maintained in the index to identify content items for presentation to a user.

The connection module 220 monitors interactions between users and content items presented by the digital magazine server 150 and stores the detected interactions in the connection store 208. In one embodiment, the connection module 220 detects interactions in response to a user of the digital magazine server 150 providing feedback about a content item, accessing a content item, sharing a content item with other users, or performing other actions with content items. Based on the detected interactions, the connection module 220 weights the interactions in different significance. For example, sharing or commenting on a content item weights more than just viewing the content item; a viewing action for a long time weights more than the same action for a short time. An interaction with a content item having more weight indicates a higher level of interest of the user in the corresponding content item.

The presentation module 240 stores instructions for presenting content items generated by the digital server 150 on a client device 130 of a user, and facilitates the presentation of content items on the client device 130. In one embodiment, the presentation module 240 receives a selection of one or more digital magazines recommended by the recommendation module 230, generates a cover page for each selected digital magazine and presents the cover pages of the selected digital magazines to the client device 130 of the user for display. In one embodiment, to generate a cover page for a selected digital magazine, the presentation module 240 retrieve articles of the digital magazine from the content store 204, selects a page template from the template store 24 based on the user profile, e.g., type of display of the client device 130 associated with the user, generates instructions on how to present the cover page on the client device 130 of the user. Instructions from the presentation module 240 are communicated to a digital magazine application or other application executing on the client device 130 on which the cover pages of the selected digital magazines are presented.

The recommendation module 230 scores digital magazines based on how related the digital magazines are to each of a set of topics in a topic vector space, which allows ranking for each topic the magazines that are most closely related to the topic. In response to receiving a user query on a topic, the recommendation module 230 selects a threshold of digital magazines on the queried topic based on their magazine-topic relevance scores, that indicate the relevance of the digital magazines to the queried topic, and presents the selection to the presentation module 240 for further processing. One embodiment of the recommendation module 230 is further described below with reference to FIG. 3.

Digital Magazine Recommendations

Figure 3:
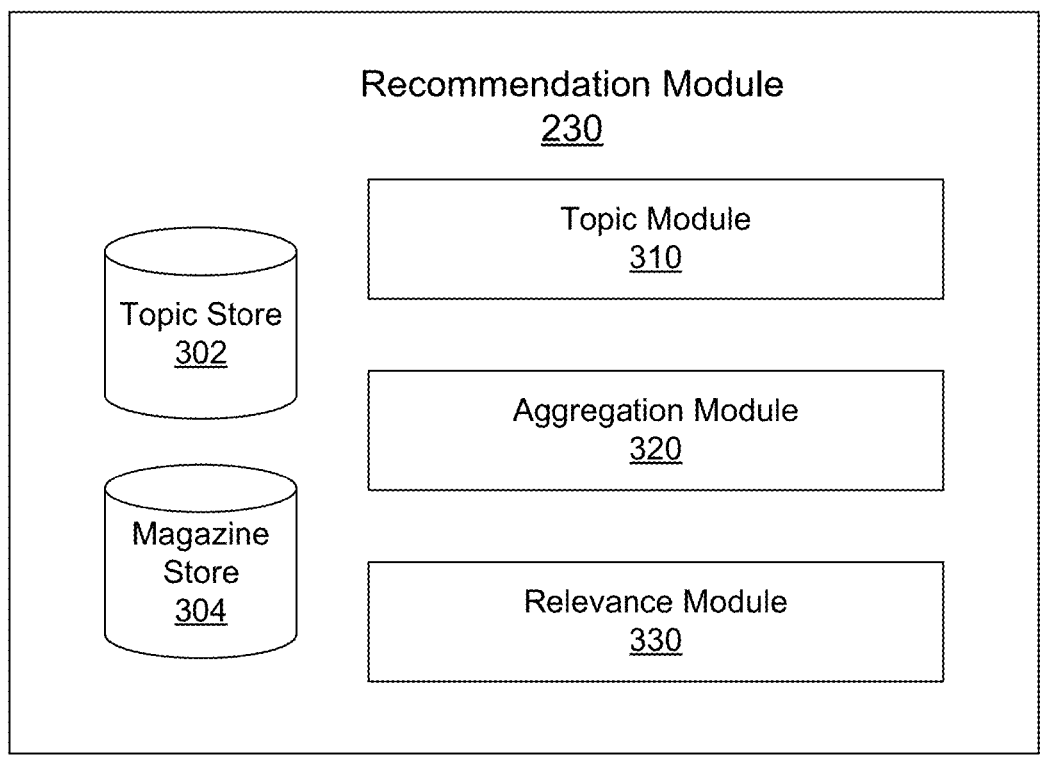
FIG. 3 is an example of a recommendation module according to one embodiment.

FIG. 3 is an example of a recommendation module 230 according to one embodiment. In the embodiment shown in FIG. 3, the recommendation module 230 has a topic store 302, a magazine store 304, a topic module 310, an aggregation module 320 and a relevance module 330. Other embodiments of the recommendation module 230 can include additional and/or different modules.

The topic store 302 stores topics that are likely of interest to users of the digital magazine server 150. In one embodiment, the topic store 302 is partitioned into multiple sections. One section of the topic store 302 stores trending topics associated with each user based on the user's most recent interactions with content items provided by the digital magazine server 150. A tending topic associated with a user represents a user's instant or most recent interest in content items on the same or similar topics. A tending topic is dynamic in that it changes over time along with a user's interactions with content items provided by the digital magazine server 150. In one embodiment, the trending topics associated with a user are determined based on the user's interactions with content items within a predefined threshold time from current time, e.g., 24 hours.

Another section of the topic store 302 stores topics associated with the ground truth of a user's interest in content times that are known to the digital magazine server 150 within an acceptable range of accuracy. In one embodiment, the topics associated with the ground truth of a user's interest are determined based on the user's historical interactions with content items within a predefined threshold time from current time, e.g., 6 months.

The magazine store 304 stores lists of URLs for the digital magazines supported by the digital magazine server 150. In one embodiment, for each digital magazine, the magazine store 340 stores a list of URLs, where each article of the digital magazine is based on the content of a resource on the Internet to which a URL of the list of the URLs references to. For example, for a digital magazine on a topic of football, the magazine store 340 stores URLs to the content items having at least a threshold likelihood of describing various aspects of football, e.g., football events, famous football players. Digital magazines on the same or similar topics can be grouped together to generate a consolidated cluster. For example, digital magazines on football, baseball, hockey are grouped together to create a consolidated cluster on sports.

The topic module 310 identifies topics from content items stored in the digital magazine server 150, e.g., in the content store 206 shown in FIG. 2. In one embodiment, topics are key terms and/or phrases associated with a content item. In some embodiments, topics are included in metadata associated with content items (e.g., hashtags). In one embodiment, the topic module 310 identifies topics using content elements of a content item, e.g., based on the frequency with which terms or phrases appear in content items; or based on the presentation of various words or phrases relative to other words or phrases. In various embodiments, words may be grouped into phrases for identifying topics in content items. For example, a content item about football player Tom Brady may correspond to the topics "Tom Brady," "New England Patriots," "National Football League (NFL)," and "court challenges." Additionally, the topic module 310 identifies topics based on video captions, categories, titles, photo titles, or photo captions of content items.

In one embodiment, the topic module 310 identifies topics associated with a digital magazine by analyzing the articles/content items included in the digital magazine. The topic module 310 groups multiple articles associated with a common topic or similar topics into a cluster and each cluster has an associated topic and number of articles in the cluster. For each digital magazine stored in the digital magazine server 150, the topic module 310 applies the similar topic identification and clustering.

In one embodiment, the identified topics of the digital magazines stored in the digital magazine server 150 are represented in a topic vector space. For example, the identified topics are included in a multi-dimensional topic vector space. The dimension of the topic vector space is determined by the number of topics included in the topic vector space. In the topic vector space, each identified topic is an axis of the topic vector space, representing a dimension of the topic vector space. In one embodiment, all or a portion of all the topics identified by the topic module 310 are included in the topic vector space based on various factors such as a timing factor, e.g., topics corresponding to news/events that happened in the United States within the past 24 hours. Other factors, such as the number of viewers associated with the topics, can be used to select the topics into the topic vector space.

The aggregation module 320 aggregates topics identified by the topic module 310 for each digital magazine stored in the digital magazine server 150 and generates a magazine vector for each magazine in the topic vector space. In one embodiment, the aggregation module 320 aggregates the identified topics associated with a digital magazine using a statistic model, e.g., a term frequency-inverse document frequency (td-idf) model. In a td-idf model, the term frequency (tf) indicates the number of times of a term in a document, and the inverse document frequency (idf) is a measure of how common or rare a term is across all documents. Other embodiments of the aggregation module 320 can use other statistic models and/or digital data aggregation schemes.

Applying the td-idf model to the topics associated with a digital magazine, the aggregation module 320 counts the frequency of a topic described by articles in the digital magazine and generates a term frequency for the topic. A digital magazine having a large number of articles on the topic gets a higher term frequency than another digital magazine having less number of articles on the topic.

To augment the aggregation based on the frequency term of a topic, the aggregation module 320 weights the term frequency of a topic, e.g., by applying an inverse document frequency weight to the term frequency of the topic. In one embodiment, the aggregation module 320 divides the total number of articles included in a digital magazine by the number of articles on the topic and takes the logarithm of that quotient to generate an inverse document frequency of the topic. The aggregation module 320 computes a td-idf weight for the topic by multiplying the topic's term frequency by its corresponding inverse document frequency. The weight can be used to indicate how important the topic is to the digital magazine. Based on the td-idf weights of the topics associated with a digital magazine, the aggregation module 320 generates a topic vector to be associated with the digital magazine, which is also referred to as a "magazine vector." For each digital magazine stored in the digital magazine server 150, the aggregation module 320 applies the similar procedure and generates a magazine vector for the digital magazine in the topic vector space.

The relevance module 330 evaluates how relevant a digital magazine is to a topic in the topic vector space. In one embodiment, the relevance module 330 measure the relevance of a digital magazine to a topic in the topic vector space by calculating Euclidean distance between the magazine vector and a topic vector associated with a hypothetical digital magazine, which is also referred to as a "pure vector" from herein. A pure vector for a particular topic has a dimension of 1 for the particular topic and dimensions of 0 for other topics in the topic vector space. In other words, the pure vector on a particular topic provides ground truth of the content items included in the hypothetical digital magazine in that each content item has more than a threshold of likelihood to be on the particular topic. Any vector comparison schemes known to those of ordinary skill in the art, e.g., cosine similarity, can be used by the relevance module 330 for the comparison. Other embodiments of the relevance module 330 measure the relevance of a digital magazine to a topic in the topic vector space use other methods, e.g., a standardized Euclidean distance, cosine similarity. Based on the relevance evaluation, the relevance module 330 generates a magazine-topic relevance score for the digital magazine with respect to each topic in the topic vector space. The magazine-topic relevance score for a digital magazine with respect to a topic indicates a degree of relevance of the digital magazine to the topic in the topic vector space. Applying the similar process to other digital magazines stored in the digital magazine server 150, the relevance module 330 generates a magazine-topic relevance score for each digital magazine with respect to each topic in the topic vector space.

The relevance module 330 further sorts the digital magazines with respect to each topic in the topic vector space based on their corresponding magazine-topic relevance scores and ranks the digital magazines based on the sorting. In response to a user query on a particular topic, the relevance module 330 selects a threshold number of digital magazines that are relevant to the queried topic based on their relevance scores on the queried topic and provides the selection to the presentation module 240 of the digital magazine server 150 for further processing.

Example Process of Digital Magazine Recommendation

Figure 4:
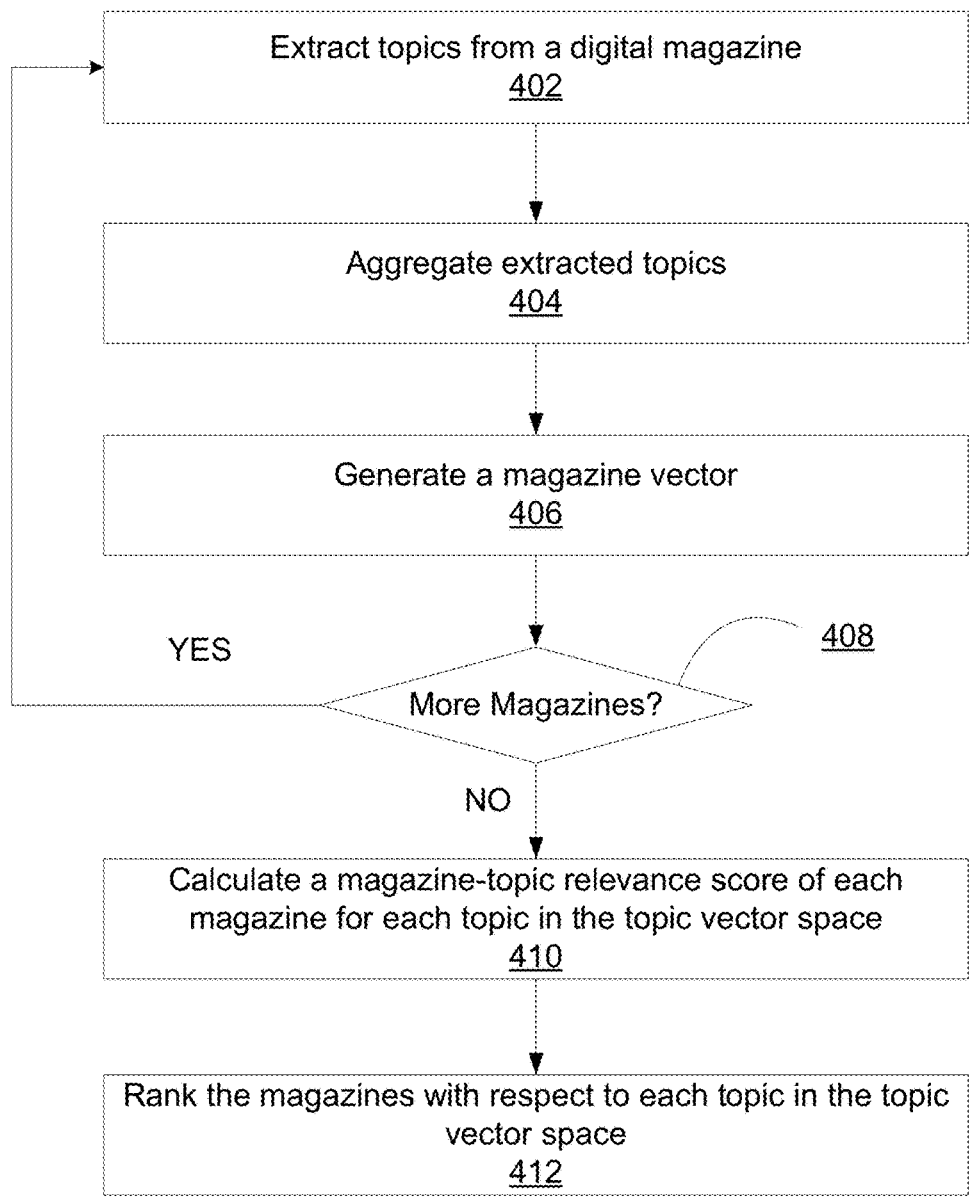
FIG. 4 is a flowchart of a process for ranking digital magazines in a topic vector space according to one embodiment.

FIG. 4 is a flowchart of a process for ranking digital magazines in a topic vector space according to one embodiment. Initially, the recommendation module 230 of the digital magazine server 150 extracts 402 topics from the articles included in a digital magazine. The recommendation module 230 aggregates 404 the extracted topics associated with a digital magazine, e.g., by calculating a td-idf weight for each identified topic, and generates 406 a magazine vector for the digital magazine in the topic vector space based on the aggregation.

The recommendation module 230 determines 408 whether there are more digital magazines for analysis. In response to more digital magazines for analysis, the recommendation module 230 applies the same or similar steps of steps 402 and 406 to each additional digital magazine and generates a magazine vector for each additional digital magazine.

The recommendation module 230 uses a topic vector space to represent the extracted topics from the digital magazines, which includes all or a portion of the extracted topics from the digital magazines. Each topic represents a dimension of the topic vector space. For each topic in the topic vector space, the recommendation module 230 calculates 410 a magazine-topic relevance score for each digital magazine with respect to the topic. Based on the relevance scores associated with the digital magazines with respect to a topic in the topic vector space, the recommendation module 230 ranks 412 the digital magazines with respect to the topic in the topic vector space. The recommendation module 230 applies the similar steps to rank the digital magazines with respect to each topic in the topic vector space.

Figure 5:
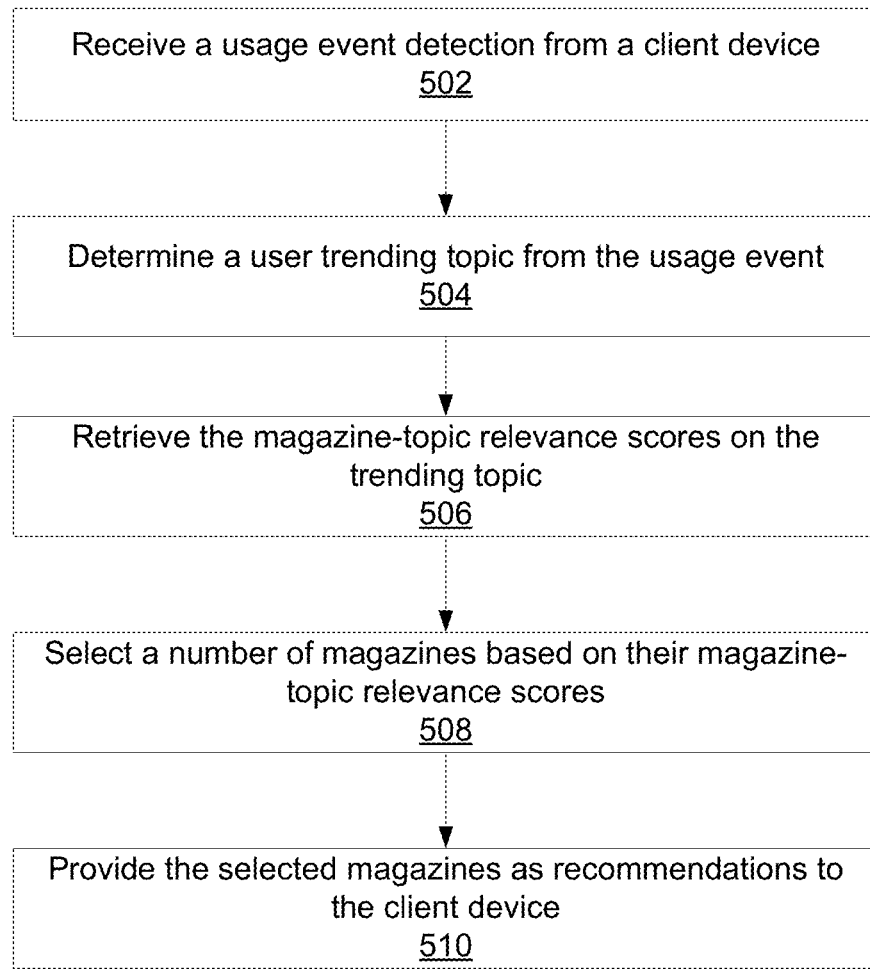
FIG. 5 is a flowchart of a process for providing recommended digital magazines to a client device of the user.

FIG. 5 is a flowchart of a process for providing recommended digital magazines to a client device of the user. Initially, the digital magazine server 150 receives 502 a usage event detection from a client device 130, e.g., a search query on a particular topic input by a user of the client device 130. The digital magazine server 150 determines 504 a user trending topic or any topic of interest to the user from the usage event, e.g., extracting a topic from the search query, and retrieves 506 magazine-topic relevance scores associated with digital magazines with respect to the user trending topic. Based on the ranking of the relevance scores associated with the digital magazines with respect to the user trending topic, the digital magazine server 150 selects 508 a threshold number of digital magazines that are relevant to the user trending topic based on the ranking. The digital magazine server 150 provides 510 the selected digital magazines as recommendations to the user of the client device, e.g., by providing cover pages of the selected digital magazines to the user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for recommending content items on a topic to a user of a digital magazine server, the method comprising:

for each of a plurality of digital magazines maintained by the digital magazine server including a processor, the processor:

identifying a plurality of content items maintained by the digital magazine server and associated with the digital magazine, extracting a topic vector for each content item by the digital magazine server, where the topic vector for a content item describes a relevance of the content item to each of a plurality of predefined topics in a topic vector space maintained by the digital magazine server, and determining a topic vector for the digital magazine by aggregating the plurality of topic vectors for the content items of the digital magazine by, for each of the plurality of topic vectors for the content items of the digital magazine:

calculating a term frequency of each topic of the predefined topics, a term frequency of a topic representing a number of content items included in the digital magazine describing the topic, applying a weighting factor to the term frequency of each topic of the predefined topics, the weighting factor of a term frequency of each topic of the predefined topics indicating how common the topic is among content items included in the digital magazine, computing a weight of each topic of the predefined topics by applying the weighting factors to corresponding topics of the predefined topics; and generating the topic vector for the digital magazine based on weights of the topics of the plurality of topic vectors for the content items of the digital magazine; and for each topic of the plurality of predefined topics maintained by the digital magazine server, the processor:

calculating a magazine-topic relevance score between each digital magazine of the plurality of digital magazines and each of the plurality of predefined topics in the topic vector space maintained by the digital magazine server, the magazine-topic relevance score between the digital magazine and a topic of the predefined topics based on a comparison of the topic vector for the digital magazine and a pure vector for the topic having a value of 1 in a dimension corresponding to the topic of the predefined topics and a value of 0 in dimensions corresponding to other topics of the predefined topics, ranking the plurality of digital magazines based on the magazine-topic relevance scores associated with the plurality of digital magazines;

determining a specific topic of the predefined topics associated with the user of the digital magazine server based on the user's interactions with content items maintained by the digital magazine server within a predefined time of a current time;

ranking the digital magazines of the plurality of digital magazines based on a magazine-topic relevance score between each digital magazine of the plurality of digital magazines and the specific topic of the predefined topics in the topic vector space maintained by the digital magazine server; and selecting digital magazines of the plurality of digital magazines having at least a threshold position in the ranking based on the magazine-topic relevance score between each digital magazine of the plurality of digital magazines and the specific topic of the predefined topics in the topic vector space maintained by the digital magazine server.

2. The method of claim 1, further comprising:

selecting at least a portion of the topics extracted from the digital magazines, each selected topic representing a dimension of the topic vector space, and each selected topic having at least one content item related to the selected topic.

3. The method of claim 1, wherein calculating the magazine-topic relevance score for the digital magazine to the topic of the predefined topics comprises:

computing a distance between the topic vector for the digital magazine and the pure vector for the topic having the value of 1 in the dimension corresponding to the topic of the predefined topics and the value of 0 in dimensions corresponding to other topics of the predefined topics; and calculating the magazine-topic relevance score for the digital magazine to the topic of the predefined topics based on the computed distance.

4. The method of claim 1, wherein calculating the magazine-topic relevance score for the digital magazine to the topic of the predefined topics comprises:

computing similarity between the topic vector for the digital magazine and the pure vector for the topic having the value of 1 in the dimension corresponding to the topic of the predefined topics and the value of 0 in dimensions corresponding to other topics of the predefined topics; and calculating the relevance score for the digital magazine to the topic of the predefined topics based on the computed similarity.

5. The method of claim 1, further comprising:

generating a cover page according to a page template for each selected digital magazine, the cover page for a selected digital magazine having one or more content items describing the specific topic, the content items being arranged according to instructions provided by the page template; and providing the cover pages for the one or more selected digital magazines to the user for display.

6. The method of claim 1, wherein the content items included in a digital magazine include at least one of text articles, digital images, videos, audios, user-generated content and any other types of content displayable within context of a digital magazine.

7. A non-transitory computer-readable storage medium containing executable computer program instructions for recommending content items on a topic to a user of a digital magazine server, the computer program instructions comprising instructions that, when executed by a computer processor included in the digital magazine sever, cause the computer processor to perform:

for each of a plurality of digital magazines maintained by the digital magazine server:

identifying a plurality of content items maintained by the digital magazine server and associated with the digital magazine, extracting a topic vector for each content item by the digital magazine server, where the topic vector for a content item describes a relevance of the content item to each of a plurality of predefined topics in a topic vector space maintained by the digital magazine server, and determining a topic vector for the digital magazine by aggregating the plurality of topic vectors for the content items of the digital magazine by, for each of the plurality of topic vectors for the content items of the digital magazine:

calculating a term frequency of each topic of the predefined topics, a term frequency of a topic representing a number of content items included in the digital magazine describing the topic, applying a weighting factor to the term frequency of each topic of the predefined topics, the weighting factor of a term frequency of each topic of the predefined topics indicating how common the topic is among content items included in the digital magazine, computing a weight of each topic of the predefined topics by applying the weighting factors to corresponding topics of the predefined topics; and generating the topic vector for the digital magazine based on weights of the topics of the plurality of topic vectors for the content items of the digital magazine; and for each topic of the plurality of predefined topics maintained by the digital magazine server:

calculating a magazine-topic relevance score between each digital magazine of the plurality of digital magazines and each of the plurality of predefined topics in the topic vector space maintained by the digital magazine server, the magazine-topic relevance score between the digital magazine and a topic of the predefined topics based on a comparison of the topic vector for the digital magazine and a pure vector for the topic having a value of 1 in a dimension corresponding to the topic of the predefined topics and a value of 0 in dimensions corresponding to other topics of the predefined topics, ranking the plurality of digital magazines based on the magazine-topic relevance scores associated with the plurality of digital magazines;

determining a specific topic of the predefined topics associated with the user of the digital magazine server based on the user's interactions with content items maintained by the digital magazine server within a predefined time of a current time;

ranking the digital magazines of the plurality of digital magazines based on a magazine-topic relevance score between each digital magazine of the plurality of digital magazines and the specific topic of the predefined topics in the topic vector space maintained by the digital magazine server; and selecting digital magazines of the plurality of digital magazines having at least a threshold position in the ranking based on the magazine-topic relevance score between each digital magazine of the plurality of digital magazines and the specific topic of the predefined topics in the topic vector space maintained by the digital magazine server.

8. The non-transitory computer-readable storage medium of claim 7, further comprising:

selecting at least a portion of the topics extracted from the digital magazines, each selected topic representing a dimension of the topic vector space, and each selected topic having at least one content item related to the selected topic.

9. The non-transitory computer-readable storage medium of claim 7, wherein calculating the magazine-topic relevance score for the digital magazine to the topic of the predefined topics comprises:

computing a distance between the topic vector for the digital magazine and the pure vector for the topic having the value of 1 in the dimension corresponding to the topic of the predefined topics and the value of 0 in dimensions corresponding to other topics of the predefined topics; and calculating the magazine-topic relevance score for the digital magazine to the topic of the predefined topics based on the computed distance.

10. The non-transitory computer-readable storage medium of claim 7, wherein calculating the magazine-topic relevance score for the digital magazine to the topic of the predefined topics comprises:

computing similarity between the topic vector for the digital magazine and the pure vector for the topic having the value of 1 in the dimension corresponding to the topic of the predefined topics and the value of 0 in dimensions corresponding to other topics of the predefined topics; and calculating the relevance score for the digital magazine to the topic of the predefined topics based on the computed similarity.

11. The non-transitory computer-readable storage medium of claim 7, generating a cover page according to a page template for each selected digital magazine, the cover page for a selected digital magazine having one or more content items describing the specific topic, the content items being arranged according to instructions provided by the page template;

and providing the cover pages for the one or more selected digital magazines to the user for display.

12. The non-transitory computer-readable storage medium of claim 7, wherein the content items included in a digital magazine include at least one of text articles, digital images, videos, audios, user-generated content and any other types of content displayable within context of a digital magazine.

* * * * *